M. ZIGRAY.
RIVET GAGE.
APPLICATION FILED OCT. 22, 1919.

1,375,747.

Patented Apr. 26, 1921.

Inventor
Martin Zigray
by Babel & Mueller
Attys

UNITED STATES PATENT OFFICE.

MARTIN ZIGRAY, OF CHICAGO, ILLINOIS.

RIVET-GAGE.

1,375,747. Specification of Letters Patent. Patented Apr. 26, 1921.

Application filed October 22, 1919. Serial No. 332,399.

*To all whom it may concern:*

Be it known that I, MARTIN ZIGRAY, a citizen of the United States, residing at Chicago, in the county of Cook and State of Illinois, have invented a certain new and useful Improvement in Rivet-Gages, of which the following is a full, clear, concise, and exact description, reference being had to the accompanying drawings, forming a part of this specification.

My invention relates to rivet gages and more particularly to a rivet gage which is adapted to determine the length of rivet required for the specific piece of riveting at hand. In order that the heads of the rivets may be evenly formed and in order that the rivets may hold properly it is necessary that the correct length of rivet be used. It is not always easy to determine with the eye just what is the exact thickness of the plates to be riveted together or the exact length of the rivet to be used. If the operator is not aware of the thickness of the plates to be riveted it is necessary that he have some means to measure this thickness. It is an object of my invention to provide a simple and inexpensive device of this character which is adapted to readily and quickly measure the thickness of the several plates which are to be riveted together.

It is a further object of the invention to provide a device of the character set forth which is also adapted to measure the diameter and length of the rivets to be used.

It is a further object of my invention to provide a device of the character set forth which is small and light so that it may be carried in the pocket of the user and which will be inexpensive to manufacture and yet serviceable in use.

With these and other objects in view which will be apparent from the detailed description of my device which follows I have disclosed in the drawings the preferred form of my device. However, it is to be understood that by this specification and the accompanying drawings I do not intend to limit myself to the specific construction disclosed as modifications in the specific structure may be required in the manufacture thereof or may occur to those skilled in this art. The real nature and scope of the invention disclosed is to be determined from the claims appended to this specification.

In the drawings where I have disclosed the preferred form of my device the same reference characters have been used to designate the same parts in each of the views. In the drawings—

My rivet gage comprises a main measuring member 3 which is provided at one end with a right angular arm 4 and at its other end with a hook shaped arm 5. This hook shaped arm is shorter than the arm 4 for reasons which will appear later. The distance between the parallel faces of the arms is preferably six inches and this distance is divided into inch lengths which are in turn divided into eighths as is usual in scales of this character. When a scale is so subdivided sixteenths and even thirty-seconds of an inch may be readily estimated from the scale.

In order that the hook-shaped arm 5 shall not be too long and so that it may still have an engaging face of sufficient length I cut away the member 3 as shown at 6. This cut away portion does not interfere with the operation of the device and still provides an engaging face on the arm 5 long enough to effectively engage the plates as shown in Fig. 2.

Figure 1:
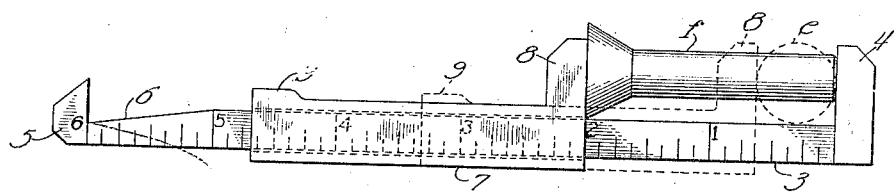
Figure 1 is a side elevation of my rivet gage when being used to measure the length of a rivet. This figure also designates in dotted lines how the device may be used to measure the diameter of rivets.

The main measuring member 3 is provided with scales on both of its sides. The scale on the side shown in Fig. 1 has its zero point adjacent the arm 4 while that side shown in Fig. 2 has its zero point at the base of the arm 5. This difference in arrangement of scales is necessary in order that the device may be adapted to perform two operations which will later be described.

Figure 3:
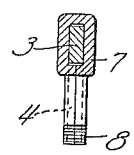
Fig. 3 is a section taken on line 3—3 of Fig. 2.

Slidable on the measuring member 3 is a slide 7 which is so shaped that it extends completely around the member 3 as is shown in Fig. 3 of the drawings. That end of slide 7 which is adjacent the arm 4 is provided with an arm 8 shaped similar to the arm 4. When it is desired to measure the length of a rivet *f*, the rivet is placed between the arms 4 and 8 and the scale mark adjacent the right hand face of the arm 8 will indicate the length of the rivet. When it is desired to measure the diameter of a rivet as shown at e in Fig. 1, the arm is moved to the dotted line position shown in Fig. 1 whereupon the operator may ascertain its diameter by glancing at the scale adjacent the arm 8.

Figure 2:
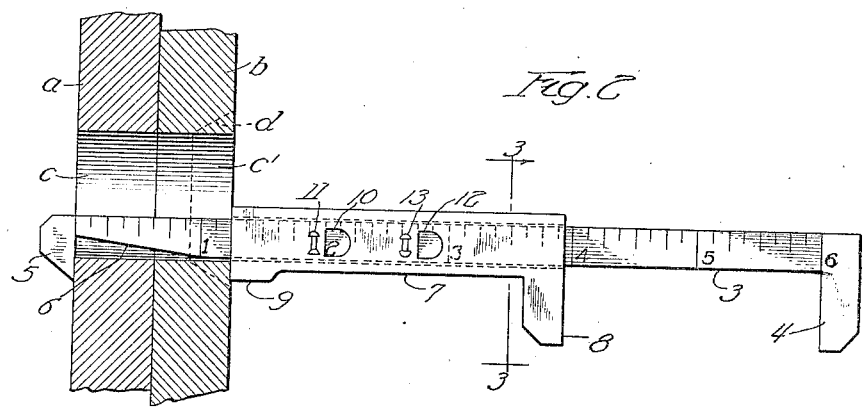
Fig. 2 is a side view of the device opposite to that of Fig. 1. This figure shows how the device is used to measure the combined thicknesses of a plurality of plates.

In Fig. 2 I have shown two plates a and b which are to be riveted together. These plates are provided with alined openings c and c'. If the operator does not know the combined thickness of these two plates he will insert the hook shaped arm through the opening and draw the arm against the side of the plate a as shown in Fig. 2. Thereupon he will move the slide 7 until the shoulder 9 provided on the slide engages the outer surface of the plate b. The distance between the end of the slide and the engaging face of the hook shaped arm 5 will be the thickness of the two plates.

It is well known that two kinds of heads are formed on rivets during the riveting operation. One is the ordinary round head and the other is a flat head which does not project above the surface of the plate. When a flat head rivet is to be formed the plate b is to be provided with a countersunk portion as indicated in dotted lines by the reference character d. It is also well known that flat headed rivets require less material and therefore a shorter length of rivet is necessary to form them. If a round head is to be formed on the rivet a longer rivet must be used. My device provides a measuring means for each style of rivet. On that side of the slide 7 which is shown in Fig. 2 I provide a sight opening 10 having a straight face on that side toward the shoulder 9. Adjacent this straight face I impress into the slide the character of a flat headed rivet as shown at 11. When a flat head is to be formed the operator will glance at the opening 10 in order to ascertain the length of rivet required. In the specific instance shown in Fig. 2 the length of rivet required is two inches.

Adjacent the opening 10 and on the same side of slide 7 I provide a second sight opening 12 with a straight line reading edge adjacent which I impress into the slide the character of a round headed rivet as shown at 13 in Fig. 2. The distance between the left hand end of the slide 7 and the straight edge of opening 10 is three-fourths of an inch, while the distance between the left hand end of the slide 7 and the straight edge of opening 12 is one and one-half inches. In other words it requires a rivet three-fourths of an inch longer when a round head is to be formed on the rivet. The characters 11 and 13 are used in order to make it more clear to the operator which reading he should take. In the specific instance shown a round headed rivet requires a rivet two and three-fourths inches long.

The slide 7 is easily formed out of a single piece of material which has the openings 10 and 12 punched therein and is thereafter bent around the member 3 and has its free edges soldered, welded or riveted together. The scale indications are impressed into the member 3 which member is preferably made of brass or other suitable metal. As the device is formed preferably of metal there are no parts to wear out or become burned. The device is preferably made in the proportions shown in the drawings so that it is small and light and is yet strong and large enough to serve all ordinary purposes of riveting.

Having thus described my invention what I claim as new and desire to secure by United States Letters Patent is:

1. A rivet gage of the character described comprising a scale member having an extending arm at one end and a hook shaped member at its other end, said scale member being provided with oppositely directed scales on the opposite sides thereof running from said arm to said hook shaped member, and a slidable member freely movable on said scale member from one end to the other end thereof and adapted to coöperate with either of said scales for measuring purposes.

2. A rivet gage of the character described comprising a scale member, an arm at one end of said member and extending at right angles thereto, a hook shaped arm at the other end of said scale member, said member being provided with scales on the opposite sides thereof, a measuring member slidable on said scale member and provided with sight openings on one side thereof to permit one of said scales to be read through said measuring member, said sight openings being so spaced as to indicate fixed distances in addition to the distance between said hook and slidable member.

3. A measuring instrument comprising a scale member having oppositely directed scales on its opposite sides, a measuring member slidable on said scale member and adapted to coöperate with either of said scales for measuring purposes, said measuring member being provided with sight openings in one of its sides through which one of said scales may be read, said sight openings being so spaced as to indicate fixed distances in addition to the distance between said hook and slidable member.

4. A measuring instrument comprising a scale member having a hook shaped arm projecting at right angles at one of its ends, a measuring member slidable toward and away from said hook shaped member, said measuring member being provided with a plurality of openings through which readings may be taken from said scale member, said openings being so spaced relative to the end of said slidable member adjacent the hook shaped arm as to indicate the overall length of rivets adapted to secure together members having a thickness equal to the distance between said hook shaped arm and said slidable member in any position thereof.

5. A measuring instrument comprising a scale member provided on one end with an arm and on its other end with a hook, said scale member being provided with a scale on one side thereof having its zero point at said hook and a scale on the opposite side thereof having its zero point at said arm, and a double ended measuring member slidable on said scale member between said hook and said arm and adapted to coöperate with either of said scales for measuring purposes.

6. A measuring instrument comprising a scale member having arms at its opposite ends which project at right angles to the body portion of said scale member, and a double ended measuring member slidable on said scale member between said arms, said measuring member being provided with a rigid angular projection at one end thereof adapted to coöperate with one of said arms and a shoulder at the other end thereof adapted to coöperate with the other of said arms for measuring purposes.

7. A measuring instrument comprising a scale member having arms at its opposite ends which project at right angles to the body portion of said scale member, and a double ended measuring member slidable on said scale member between said arms, said measuring member being provided with a rigid projection at one end thereof adapted to coöperate with one of said arms and a shoulder at the other end thereof adapted to coöperate with the other of said arms for measuring purposes, said measuring member having a sight opening in one of its sides through which the indications of said scale member may be read.

8. A measuring instrument comprising a scale member having oppositely directed scales on its opposite sides, an arm in one end of said member extending at right angles to said member, a hook at the opposite end of said member projecting at right angles to the body of said member, and a double ended measuring member slidable on said scale member, said measuring member having an arm adapted to coöperate with said first named arm, and a shoulder adapted to coöperate with said hook to measure an object placed therebetween.

9. A riveting gage comprising a scale member having an arm at one end and a hook at its other end, each projecting at right angles to the body of said scale member, said member being provided with oppositely directed scales on the opposite sides thereof extending from said arm to said hook, a measuring member slidable on said scale member and adapted to coöperate with either of said scales for measuring purposes and having a plurality of sight openings through which the indications on one side of said scale member may be read, said openings being so spaced relative to the end of said slidable member adjacent the hook end of said scale member as to indicate the overall length of rivets adapted to secure together members having a thickness equal to the distance between said hook end and said slidable member in any position.

10. A measuring instrument comprising a scale member having an arm at one end and a hook at its other end, said arm and hook projecting at right angles to the body of said scale member, a measuring member slidable on said scale member and having at one end an arm to coöperate with said first named arm and at its other end a shoulder to coöperate with said hook, to measure an object placed therebetween said scale member being provided with a scale on one side thereof having its zero point at said hook, said measuring member being provided with a plurality of sight openings through which the lengths of flat and round headed rivets may be read.

11. A measuring instrument of the character described comprising a scale member having an arm at one end and a hook at its other end, said scale member being provided with a scale on one side thereof having its zero point at said arm and a scale on the other side thereof having its zero point at said hook, a measuring member slidable on said scale member and having an arm to coöperate with said first named arm to measure the diameter and length of a rivet, and a shoulder adapted to coöperate with said hook to measure the thickness of the plates to be riveted, said measuring member being provided with sight openings in one side thereof through which indications may be read from that scale which has its zero point at said hook.

In witness whereof I hereunto subscribe my name this 17th day of October, A. D. 1919.

MARTIN ZIGRAY.